United States Patent [19]

Viswanathan

[11] Patent Number: 5,570,106
[45] Date of Patent: Oct. 29, 1996

[54] METHOD AND APPARATUS FOR CREATING HORIZONS FROM 3-D SEISMIC DATA

[75] Inventor: Venkatraman Viswanathan, Katy, Tex.

[73] Assignee: Landmark Graphics Corporation, Houston, Tex.

[21] Appl. No.: 98,506

[22] Filed: Jul. 28, 1993

[51] Int. Cl.$^6$ .................................................. G01V 1/00
[52] U.S. Cl. .............................. 345/133; 367/72; 364/421
[58] Field of Search .................................. 367/72, 73, 38; 364/421, 420; 345/115, 118, 121, 162, 156, 157, 119, 145, 133

[56] References Cited

U.S. PATENT DOCUMENTS

| | | | |
|---|---|---|---|
| 5,056,066 | 10/1991 | Howard | 367/72 |
| 5,153,858 | 10/1992 | Hildebrand et al. | 367/72 |
| 5,251,184 | 10/1993 | Hildebrand et al. | 367/72 |
| 5,343,440 | 8/1994 | Kan et al. | 367/72 |

OTHER PUBLICATIONS

User manual "Aldus Photostyler" ver 1.1, Jun. 1992.

Primary Examiner—Richard Hjerpe
Assistant Examiner—Kara Farnandez Stoll
Attorney, Agent, or Firm—Bush, Moseley, Riddle & Jackson, L.L.P.

[57] ABSTRACT

A method and apparatus for deleting and rescanning areas of a horizon display on a computer monitor is disclosed. A cursor, controlled by a pointing device such as a mouse, is directed to a first area on the monitor which is adjacent a second area of the horizon which is described to be deleted and rescanned. The cursor is dragged from the first area across the second area while a user pushes the control button of the mouse thereby defining coordinates of an area for which all points are to be deleted. The points in the first area are scanned to designate them as seed points. Such seed points are used to pick horizon points in the second area. Such picked points are then used to fill-in the second area.

5 Claims, 4 Drawing Sheets

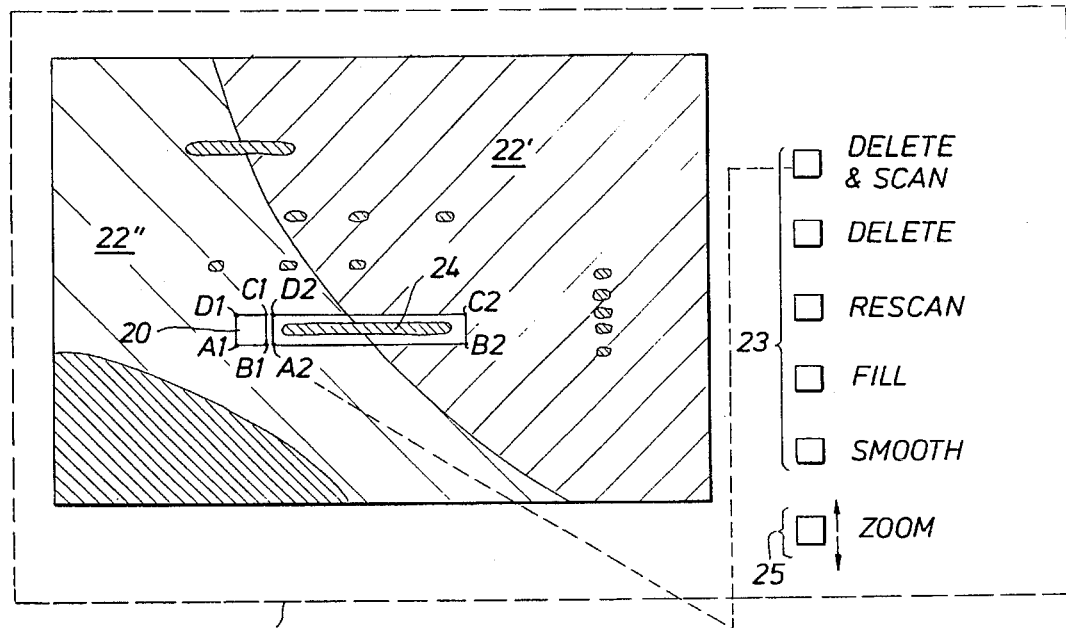
FIG.10
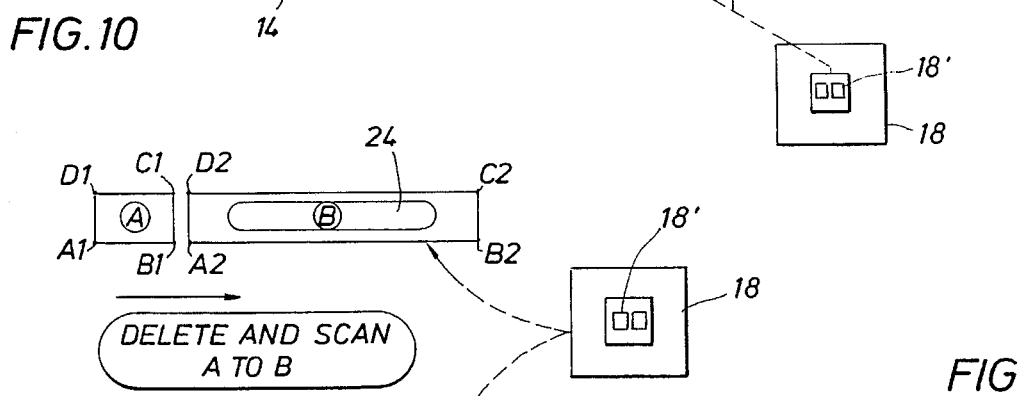
FIG.11
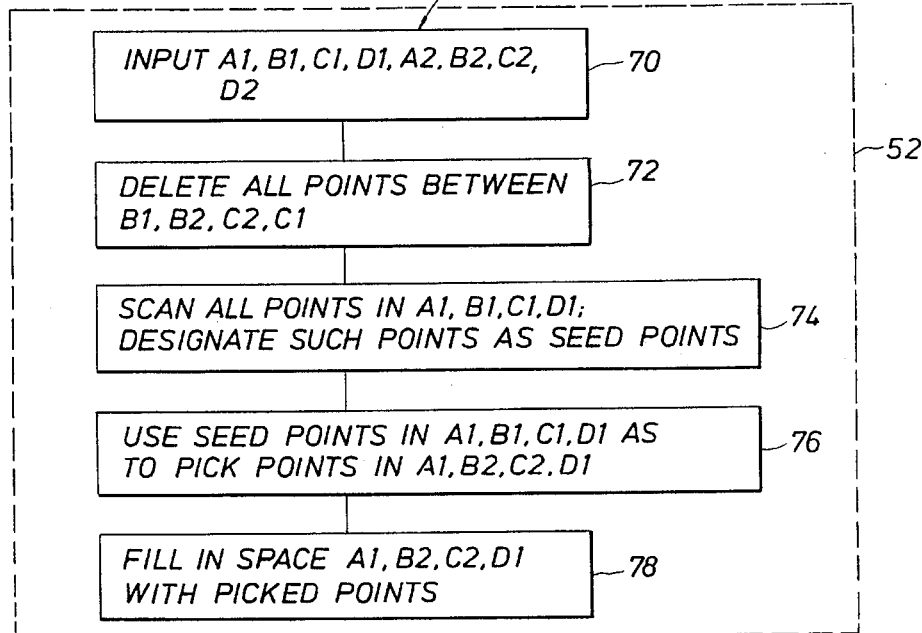

METHOD AND APPARATUS FOR CREATING HORIZONS FROM 3-D SEISMIC DATA

BACKGROUND OF THE INVENTION

1. Field of Invention

This invention relates generally to the field of seismic data interpretation. In particular the invention relates to a machine process for selection of three-dimensional (3D) seismic data or a "horizon" to provide petroleum exploration professionals more detailed understanding of subsurface geology and geometry. Still more particularly, this invention relates to an interactive method and apparatus by which an explorationist may change portions of a workstation monitor displayed horizon which has been created from a 3-D seismic data base.

2. Description of the Prior Art

FIGS. 1 through 7 of the drawings illustrate features and methods associated with the prior art picking methods and are used herein to illustrate and define a horizon which has been picked from 3D seismic data and displayed on a workstation screen. FIGS. 8 through 12 illustrate apparatus and methods of the invention and are referenced in connection with the Description Of The Invention section of this specification below. Only figures associated with prior art methods are introduced here.

FIG. 1 illustrates a portion of a hypothetical 3D seismic data volume in order to explain the three-dimensional relationships discussed in the text and accompanying drawings in this specification;

FIG. 2 is an isometric view of a portion of five seismic traces which illustrates the relationship between a "seed point" and its four adjacent "target" traces;

FIG. 3 illustrates a prior art "simple" or non-iterative automatic tracking method;

FIG. 4 illustrates an example of how a "simple" picking mode or method may fail to pick a target trace;

FIG. 5 illustrates a prior art "iterative" autotracking method.

FIG. 6 illustrates an example of how an "iterative" picking mode or method may fail to pick a target trace.

FIG. 7 is a schematic illustration of a failure mode for picking in either the iterative mode or simple non-iterative mode where the target wavelet is more than a predetermined difference in time for the seed wavelet.

FIG. 1 is an isometric view of a portion of a hypothetical three-dimensional (3D) seismic data volume. The small circles at the top of the volume represent the surface location of individual traces. The vertical lines represent seismic traces which are measured in time or distance along the z-axis of the volume. Each individual trace is an amplitude versus time representation of an acoustic reflection from strata in the earth. A sequence of x versus time traces is called a "line" by seismic explorationists. A sequence of y versus time traces is called a "cross-line". Of course, the y versus time traces may be designated a "line" and the x versus time traces called a "cross-line".

In the seismic art vocabulary, a horizontal section or time slice is a horizontal slice or plane through the 3D volume of data. A plot of common attributes such as amplitudes of seismic reflection wavelets on x-y axes as a function of their depth (or time) is similar to a surface topographic map, but of course such a plot is of a subsurface strata. Such a plot is called a horizon. In other words, a horizon is a surface along a bedding plane of a subsurface formation.

In less than ten years, computer aided exploration revolutionized seismic exploration and field development. Until recently, however, one aspect of seismic interpretation—picking subsurface horizons—or simply, "picking", remained essentially unchanged from paper and pencil methods.

Traditionally, picking was done manually by drawing with colored pencils on paper, one seismic section or line at a time, an incredibly tedious process. In the early 1980's interactive CAEX (an acronym for Computer Aided Exploration) workstations gave seismic explorationists the ability to pick 3D data more quickly and effectively. While interpreting seismic lines (that is, a two-dimensional vertical slice or a "vertical seismic section") was still accomplished by viewing and picking one line at a time, it could then be done by using a computer pointing device, or mouse, in combination with a display screen or monitor and clicking the cursor on a few selected points along a horizon and letting the machine pick all the rest of the points on that line. This was the first type of automated picking, and represented an incremental increase in both productivity and accuracy over manual picking.

A horizon is typically displayed on a CRT screen of a workstation, that is, a computer. The display is usually an x-y display including a seed point or points and the "picked" points through the 3D seismic data. The difference in depth or time of the target points from the seed point is indicated, for example, by the color of the picked point.

In one prior art automatic system for tracking a bedding plane or horizon in a generally horizontal zone of 3D data, a user selected or "input" at least one "seed point", which then "expanded" in all four directions within the 3D data volume as illustrated in FIG. 2 until it reached the boundaries of a user specified zone. Users had the option of tracking seismic data in one of two modes: simple (non-iterative) or iterative.

A "seed point" is specified by its x and y location and its time or depth (i.e., the z-axis of FIG. 1). It is also specified by a characteristic of the reflection wavelet at that point. Such characteristic is usually the maximum amplitude of the reflection wavelet at that location in the volume of the data. Other characteristics or "attributes", such as minimum amplitude, phase, frequency, etc., of the reflection at the x,y,z point may be used. As illustrated in FIG. 3 a first mode is for non-iterative tracking which searches the seismic traces adjacent seed points for similar amplitude values, picks the best one, and then proceeds to the next available trace without double-checking the accuracy of the pick.

FIG. 4 illustrates an example as to how an adjacent wavelet may not be picked in the non-iterative mode. If a negative amplitude is sensed on an adjacent trace at the same time or depth, then such target trace is not selected, that is, it is dead.

A second or an iterative picking mode verifies an adjacent trace as a pick by cross-referencing the previous trace. Once verified, the adjacent trace is treated as a seed point and the picking of adjacent traces from it proceeds. FIG. 5 illustrates such prior art iterative picking. Verification means that if the amplitude of the picked trace is within the limits of tolerance set by the user, the pick is accepted. Users can specify (on a scale of 1–10) the degree of amplitude similarity they are willing to allow. If a pick does not pass this acceptance test, it is designated "dead" until at least one directly adjacent trace matches sufficiently to accept it.

More specifically, once a seed point is selected on a trace, the trace is scanned up and down the z or time axis to find the local extrema amplitude or simply "extrema". A local extremum of a variable $x_i$ where i is a digitizing index, is defined as $$X_{i-1} < X_i \geq X_{i+1}, \text{ or}$$

$$X_{i-1} > X_i \leq X_{i+1}.$$

Such scanning is bounded by zero crossings of the amplitude of the trace in the case of a peak or a trough. Such extrema will typically vary with time a small amount. For example, if $T_O$ represents the seed point, $T_1$ would typically represent the time of the extrema. Next, the time $T_O$ is started on the target trace. On it, the time is varied up and down between zero crossings of its trace amplitude until the nearest extrema $T_2$ is found. Finally, the time $T_2$ is used on the trace on which the seed point exists and on such "seed" trace scanning up and down the "z" axis is again performed for the nearest extrema $T_3$. If $T_3$ equals $T_1$, then iterative tracking has been achieved and tracking continues.

FIG. 6 illustrates an example as to how an adjacent wavelet may not be picked in the iterative mode. Notice that the time $T_3$ is beyond the zero crossing window of the seed point $T_0$. Thus, the target trace is not picked.

The amplitude acceptance test tolerance of the prior art iterative tracking mode defines a function, $$S = \left| \frac{A_1 - A_2}{A_1 + A_2} \right| \text{ where}$$

$A_t$=Amplitude of the target wavelet of the target trace at $T_2$, and $A_1$=Amplitude of the seed wavelet from the seed trace at $T_1$.

The value of S is bounded by values of 0 and 1. The more similar the two amplitudes, the closer the S function is to zero. The more dissimilar the two amplitudes, the closer the S function is to 1. Next, a score function is evaluated:

$$\text{SCORE}=(S\times 9.0)+1.$$

The score is compared with a control value from 1 to 10 selected by the interpreter or user of the data. Scores greater than the control value prevent a target trace from being picked.

FIG. 7 illustrates a further horizon picking failure mode in addition to the method failure mode discussed above with respect to FIGS. 4 and 6 and further in addition to the score failure mode discussed above. The $\Delta t$ failure mode specifies that an attempted pick is a failure if the difference in time from the time of the picked wavelet to the time of the seed wavelet is greater than a predetermined input $\Delta t$. Times of wavelets are usually measured at their maximum amplitude. FIG. 7 illustrates that in the iterative mode, a target wavelet may satisfy the method picking test (i.e., iterative tracking is proper) and the score test (depending on the user's input of a reference score), but if the $\Delta T$ measured between the time of the target wavelet and the seed wavelet is greater than an input reference $\Delta T$, the pick fails.

After the tracking proceeds with each selected target trace becoming a seed trace for selecting more target traces, a "horizon" has been picked. The x, y and t (or z) coordinates of each selected wavelet are stored in the computer memory. A horizon is typically displayed on a CRT screen of a work station (a powerful computer adapted for specialized uses such as seismic data interpretation, CAD/CAM work etc.). The display is usually an x-y display of the seed point (or points) and all the picked points which correspond to the seed point of the 3D seismic data. The variation in depth (that is, time) from the seed point is indicated, for example, by the color of the picked point.

As discussed above, there are several ways that certain x, y areas of the horizon may not yield picked data. In other words, there are areas of a typical horizon where blank or black areas are presented on the monitor display because of a picking failure. Such failure might be due to a method failure (as illustrated in FIGS. 4 or 5, 6) a score failure (as discussed above) or a $\Delta T$ failure as illustrated in FIG. 7. An explorationist, when confronted with a horizon presented on a screen observes areas which represent unpicked data.

The prior art of horizon picking apparatus and method has provided no means by which a user of a computer, which includes automatic picking software and which displays a picked horizon on a CRT of the computer, may interactively manipulate the horizon displayed on the CRT screen, especially at areas where no horizon picks were made by the automatic picking program.

IDENTIFICATION OF OBJECTS OF INVENTION

A primary object of the invention is to provide a method and apparatus by which a user may interactively manipulate a horizon display on a CRT screen.

Another object of the invention is to provide a method and apparatus by which a CRT displayed horizon may be interactively manipulated with a pointing device, such as a mouse, in order to delete areas of the displayed horizon which were not originally picked, with the option of automatically rescanning the deleted areas, or filling in the horizon with interpolated data and smoothing the display across boundaries.

SUMMARY

The objects of the invention as identified above, as well as other advantages and features of the invention are realized in an apparatus and method including a computer program used in conjunction with a horizon picking computer apparatus. Such apparatus and method scan 3-D seismic data to produce a horizon starting from one or more user input seed points. The horizon is displayed on a CRT of the computer workstation. The display may be accessed interactively by the user by using a computer pointing device, commonly called a mouse. Such mouse, under user control, controls the position of a cursor on the screen.

A computer program according to the invention is provided with computer apparatus which works in conjunction with the Horizon Picking Computer Program which has been employed to automatically "pick" or track 3D Seismic Data so as to display the horizon on the CRT. Areas of "dead" or bad data appear on the horizon display where picking failed.

In a delete and scan mode between horizontally or vertically adjacent areas, the mouse is first "clicked" on a first area of "good" horizon points and then dragged (i.e. with the mouse button on) to and across a second area which includes "bad" or non-existent horizon data. The method of the invention as incorporated in the delete and scan computer program deletes all the data points in the second or "dragged" area, rescans all the first clicked area and designates picked points of such area as seed points. Such seed points are used to expand the scan into the dragged area. The picked points of the second or dragged area are then used to fill in that space on the CRT display.

For dragged areas that are neither horizontal nor vertically disposed with respect to the first clicked area on the CRT display, a stair step application of the basic delete and scan method is used.

The program may be instructed, by clicking the mouse on screen command buttons, to delete the points of the dragged area, to rescan the points of the dragged area, to fill in the dragged area with picked points of a certain depth, or to smooth the picked points across a horizon boundary.

BRIEF DESCRIPTION OF THE DRAWINGS

The objects, advantages and features of the invention will become more apparent by reference to the drawings which are appended hereto and wherein like numerals indicate like elements and wherein an illustrative embodiment of the invention is shown, of which:

FIG. 10 is an illustration of a horizon displayed on a CRT screen with a mouse-controlled cursor which is first clicked in an area of good picks and then dragged across an area which includes bad horizon data;

FIG. 11 is a flow diagram which illustrates how a delete and scan function is performed by means of a computer program.

DESCRIPTION OF THE INVENTION

Figure 1:
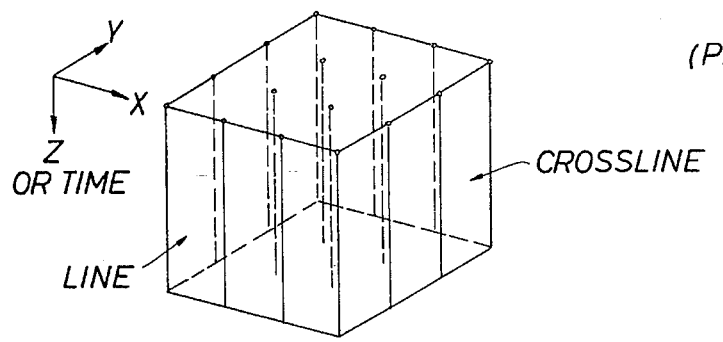
FIGS. 1–7 were described in the BACKGROUND section above.
Figure 2:
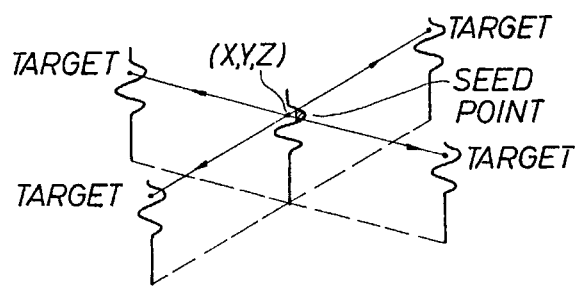
Figure 3:
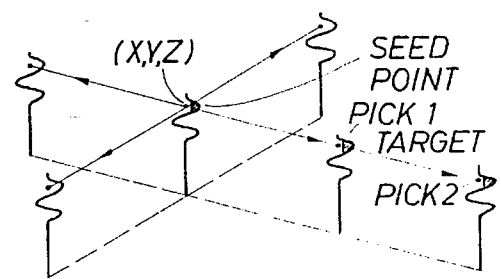
Figure 4:
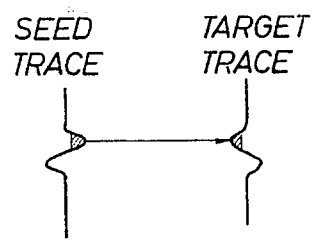
Figure 5:
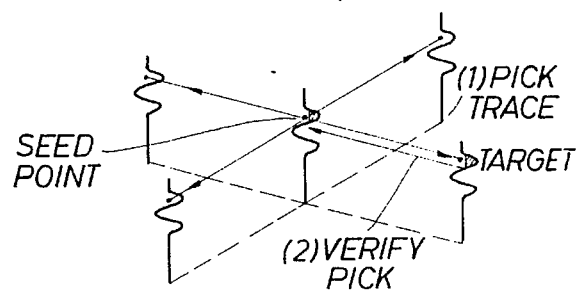
Figure 6:
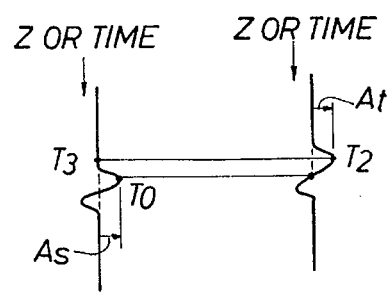
Figure 7:
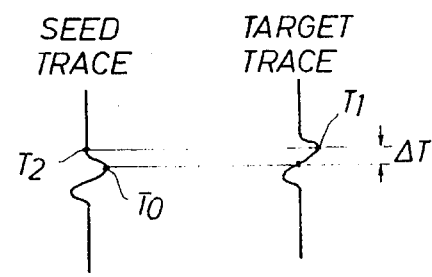
Figure 8:
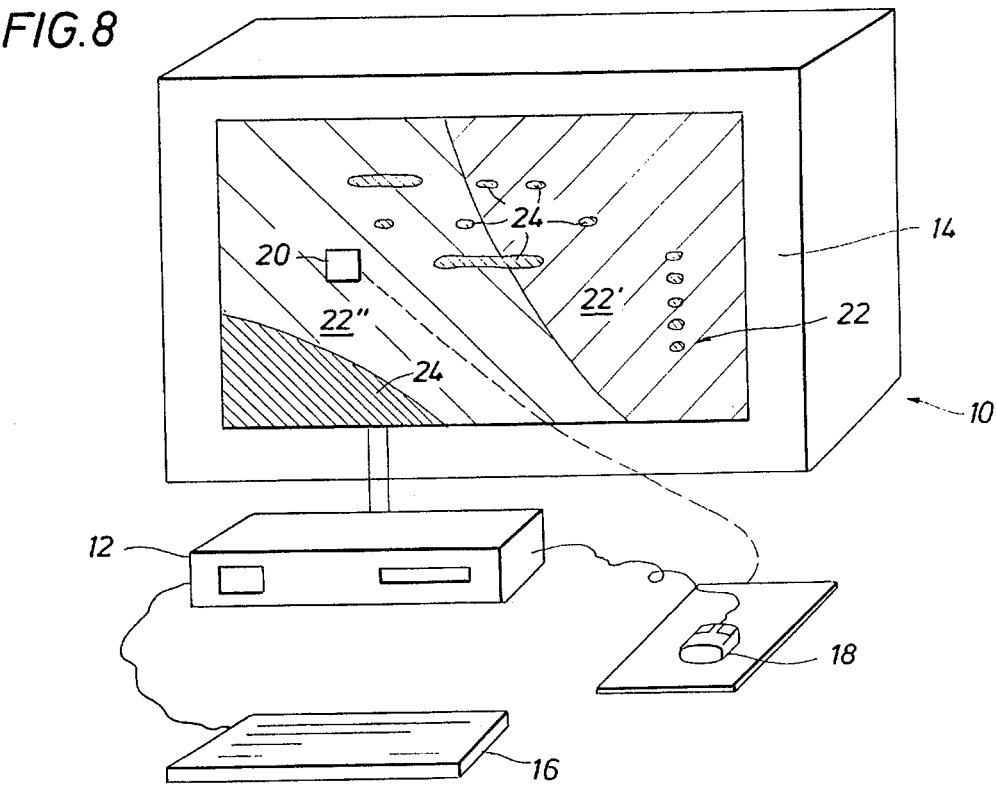
FIG. 8 is an illustration of a computer workstation with a horizon displayed on its monitor screen (CRT screen) and with a pointing device such as a mouse which controls a cursor superimposed on the screen.

FIG. 8 schematically illustrates a workstation 10 including a CPU 12, a CRT or monitor 14 and input devices including a keyboard 16 and screen pointing device or mouse 18. Mouse 18, through user interaction, moves a cursor 20 to different positions on the screen of monitor 14. Cursor 20 may be made larger and smaller on the screen by means of computer program and user interface mechanisms well known to computer programmers of ordinary skill in the art of interactive computer controls.

A hypothetical horizon 22 is shown presented on the screen of monitor 14. Such horizon is picked from a user supplied seed point or points using a picking or scanning computer program which manipulates 3D seismic data stored in a data base of memory.

The two large cross hatched areas 22', 22" represent picked points of a strata in the earth which have two different depths. On an actual workstation monitor, such two different areas would be presented in two different colors to represent such different depths. The areas of small cross hatching 24 represent "holes" or areas on the horizon which were not picked in the automatic picking method used to produce such display. (The picking methods used to produce such a horizon are described in U.S. Pat. No. 5,056,066 issued Oct. 8, 1991, U.S. Pat. No. 5,153,858 issued Oct. 6, 1992 and U.S. application Ser. No. 08/046,026 filed Apr. 12, 1993, now U.S. Pat. No. 5,432,751. Such patents and application are incorporated by reference herein for their disclosure as to automatic scanning or "picking".)

In order to manipulate the displayed horizon, this invention provides a user, by manipulating the mouse 18 and controlling the cursor 20 on the monitor, with the capability to change the horizon display. If a user observes areas on the displayed horizon which were not picked, he may want to delete that portion of the displayed horizon and rescan that area, or he may simply want to delete a section of the horizon and later rescan that portion, or he may want to fill in an unpacked area with the data corresponding to a certain horizon depth or he may want to smooth the depth display between depth boundaries on the display.

Figure 9:
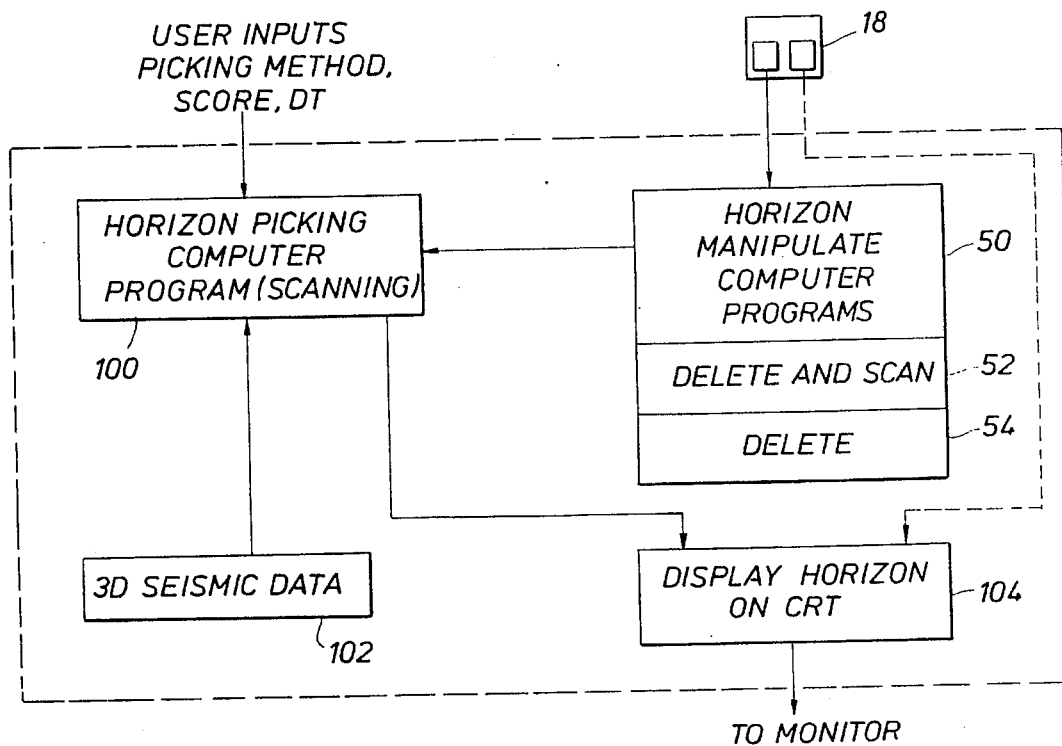
FIG. 9 is a schematic diagram illustrating the interaction of a horizon manipulation computer program with other programs for picking horizons from 3D Seismic Data and displaying such horizons on the CRT screen.

FIGS. 9, 10 and 11 illustrate the basic method of the invention relating to the delete and scan procedure. FIG. 10 illustrates monitor 14 with function boxes 23 displayed on the screen according to the manipulative function available to a user. Each function is achieved by pointing the cursor 20 to one of the boxes 23 through manipulation of mouse 18. With the cursor pointed to the delete and scan box of boxes 23 and a "click" of button 18', a signal is sent to the Horizon Manipulate Computer program 50 of FIG. 9 that the delete and scan function, that is computer program 52 is to be accessed upon the receipt of further data. The user may want to change the user inputs for picking relating to the method picking, score, and $\Delta T$. Relaxed values from those originally used in picking the horizon may be desired.

Next, the user manipulates the cursor 20 to a position in "picked" data (e.g., area 22") which is adjacent an area of "non-picked" data, (e.g., area 24). The user manipulates the size of the cursor to correspond to the approximate size of the unpicked area. In other words, in the example illustrated in FIG. 10, the vertical height of the cursor is made approximately equal, through use of a zoom feature illustrated schematically by Zoom box and arrows 25, to the vertical height of the rectangular "box" of unpicked data immediately to the right of the cursor. The user clicks a mouse button 18' to define an "A" area as shown on FIGS. 10 and 11. Such click on the "A" area defines points A1, B1, C1 and D1 of such area. Next, the user, while holding down button 18' of mouse 18, drags the cursor 20 to and across the area 24 of unpicked data. Such dragging of the cursor 20 specifies an area B defined by points A2, B2, C2 and D2. Points B1 and A2 and C1, D2 may be coexistent or they may be distinct. That is, area A may be contiguous with area B, or the two areas may be separated by a small distance between such areas.

FIG. 11 illustrates a flow chart of the computer program 52 used to accomplish the delete and scan function from an area A to an area B. Although area B is illustrated as being horizontally to the right of area A, the method of the invention is the same where area A is to the right of area B, or area A is beneath area B or above area B. In each case, area A is in an area of picked data of a displayed horizon, and area B is in an area of unpicked data.

FIG. 9 illustrates how the delete and scan program 52 interfaces with the Horizon Picking Computer program of U.S. Pat. No. 5,056,066 or U.S. Pat. No. 5,153,858. Such program 100 operates on 3D Seismic Data, using seed points, to scan or pick the data of the 3D seismic data to produce the horizon display.

The scan and display program 52 of FIG. 11 receives its input of points A1, B1, C1, D1 (that is area "A" as described above) by the click action of button 18' of mouse 18.

Likewise the input of points A2, B2, C2, D2 is achieved by dragging the cursor 20 across an area of unpicked points so as to define an area B. Such input is indicated by logic box 70. Next, control in the program 52 is passed to logic box 72 where all points, picked points and unpicked points, within the area defined by B1, B2, C2, C1 are deleted.

Control then passes to logic box 74. The points within area A are rescanned in the Horizon Picking program 100 and are designated as seed points. Such seed points are used, under control of logic box 76, in picking program 100 to pick points in the combined areas A and B. Next, such picked points are used to fill in the space of A1, B2, C2, D1 (that is A and B and any space between A and B) with the new picked data via display program 104, a program which interfaces between the computer 12 and monitor 14.

Figure 12:
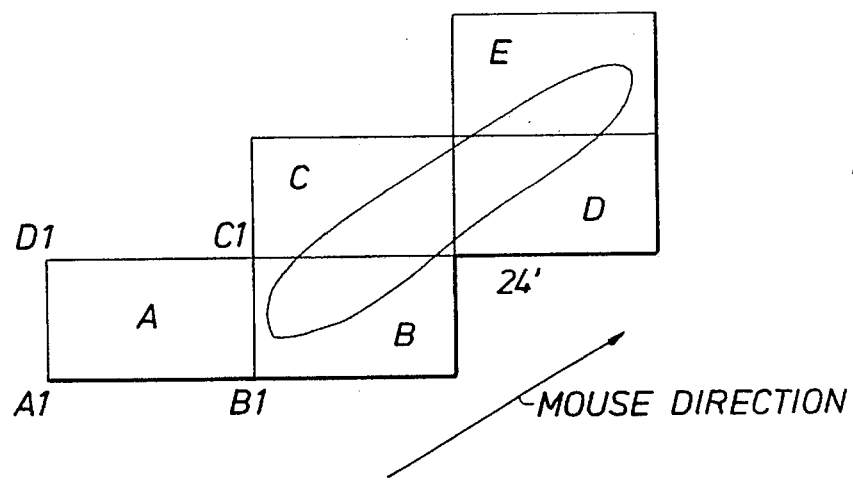
FIG. 12 is an illustration of a horizon having bad data which is manipulated by a mouse controlled cursor in a diagonal direction, with a computer flow diagram of FIG. 13 illustrating how the data is processed for diagonal manipulation.
Figure 13:
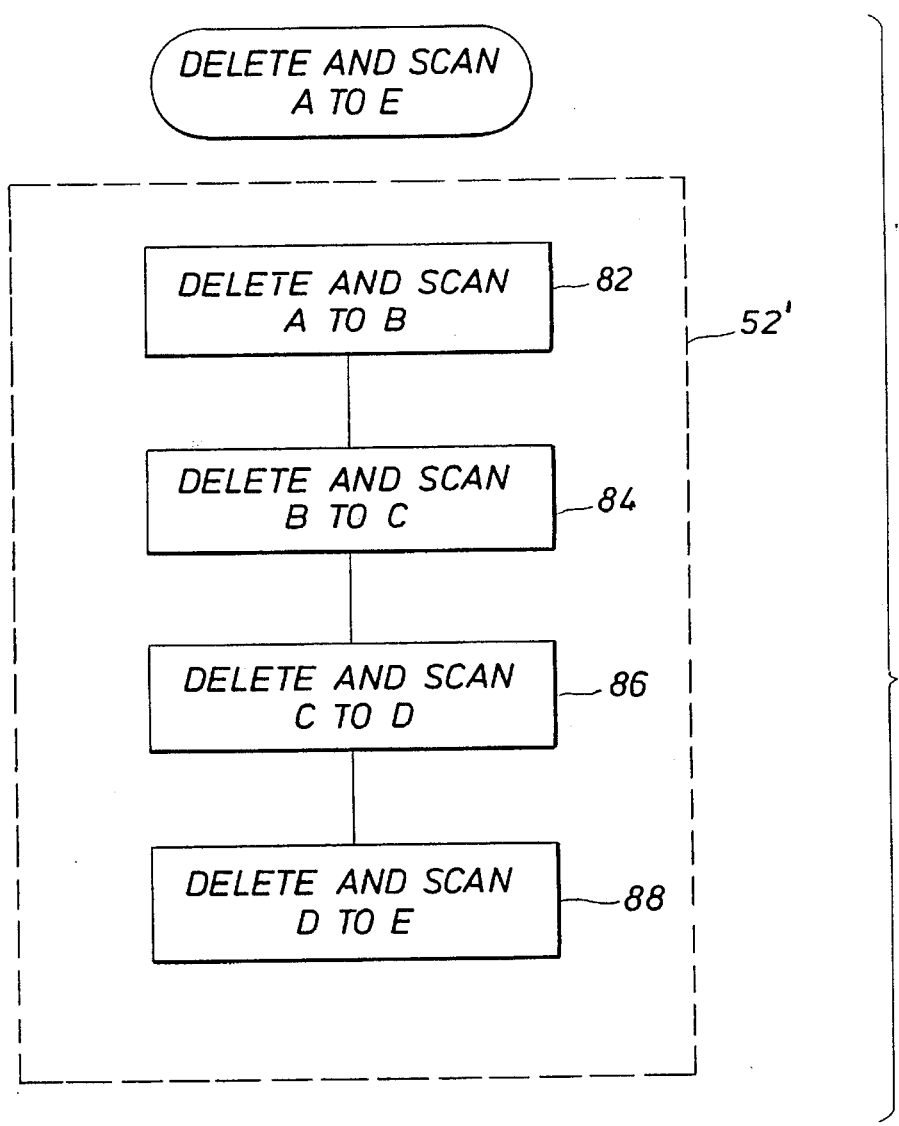

FIG. 12 illustrates the delete and scan procedure according to the invention where a diagonal area of unpicked points 24' is to be deleted and rescanned. In this case the cursor is brought to area A in the picked data portion of the horizon display. The cursor is then dragged, while continuing to hold the button 18' down, so as to end, for example at area E of the graphical portion of FIG. 12. For such a diagonal case, the stair step (horizontal, vertical) regions B, C and D are automatically defined to correspond with the diagonal movement path of the cursor. The delete and scan program 52' (labeled Delete and Scan A to E as shown in FIG. 13) then performs the delete and scan function of program 52 under control of logic box 82. In other words, the program identified by reference number 52 of FIG. 11 is performed from the area A to area B. Next, the delete and scan function is performed from area B to area C under control of logic box 84. Notice that such movement proceeds vertically from B to C. Next the delete and scan function is performed from area C to D control of logic box 86 and then from area D to E under control of logic box 88.

The other functions identified in FIG. 10 are related to the invention described. For example, the delete function is achieved by clicking on the delete box of boxes 24 and dragging the cursor 20 across an area to be deleted. The program 72 simply deletes all picked points in such display. Subsequently, the user may click on the box labeled rescan of boxes 24, and after dragging the cursor across an area which has been deleted, program 76 of flow chart 52 rescans the deleted data. The fill function and smooth function of boxes 24 respectively fill in a space of deleted data with the same depth data as its surrounding area or interpolate depth data, across a boundary of areas of two different depths.

Various modifications and alterations in the described methods and apparatus will be apparent to those skilled in the art of the foregoing description which does not depart from the spirit of the invention. For this reason, these changes are desired to be included in the appended claims. The appended claims recite the only limitation to the present invention. The descriptive manner which is employed for setting forth the embodiments should be interpreted as illustrative but not limitative.

What is claimed is:

1. A method of deleting and rescanning areas of a horizon display on a computer monitor, where a horizon is a topographic representation of a subterranean strata derived from picked points of a 3-D seismic data base, the method comprising the steps of:

directing a cursor of a pointing device to a first area of said horizon display adjacent a second area of said horizon display, which is to be deleted, said first area covering at least a portion of an area of said horizon display with picked points;

defining a first set of coordinates for said first area by activating a control button on said pointing device;

defining a second set of coordinates for said second area by dragging said cursor of said pointing device from said first area to and across said second area, said first area being contiguous with said second area to form a combined area;

deleting all horizon points within said second area defined by said second set of coordinates;

scanning all points in said first area and designating all points picked in said first area as seed points;

using said seed points to pick horizon points in said combined area; and filling in said combined area of said horizon display with said picked horizon points from said combined area.

2. The method of claim 1 wherein said first area and said second area are horizontally adjacent each other.

3. The method of claim 1 wherein said first area and said second area are vertically adjacent each other.

4. The method of claim 1 wherein said first area and said second area are diagonally adjacent each other.

5. Apparatus for deleting and rescanning areas of a horizon display on a computer monitor, where a horizon is a topographic representation of a subterranean strata derived from picked points of a 3-D seismic data base, comprising:

pointing device means for directing a cursor to a first area of said horizon display adjacent a second area of said horizon display, which is to be deleted, said first area covering at least a portion of an area of said horizon display with picked points;

control button means on said pointing device means for defining a first set of coordinates for said first area and for defining a second set of coordinates for said second area, said first area being contiguous with said second area to form a combined area;

computer program means for deleting all horizon points within said second area defined by said second set of coordinates;

computer program means for scanning all points in said first area and designating all points picked in said first area as seed points;

computer program means for using said seed points to pick horizon points in said combined area; and computer program means for filling in said combined area of said horizon display with said picked horizon points from said combined area.

* * * * *